(12) United States Patent
Wirtz

(10) Patent No.: US 9,702,160 B2
(45) Date of Patent: Jul. 11, 2017

(54) ABOVE-GROUND SHELTER

(71) Applicant: American Safety Shelter, LLC, Tulsa, OK (US)

(72) Inventor: Jerry Wirtz, Ponca City, OK (US)

(*) Notice: Subject to any disclaimer, the term of this patent is extended or adjusted under 35 U.S.C. 154(b) by 0 days.

(21) Appl. No.: 14/294,855

(22) Filed: Jun. 3, 2014

(65) Prior Publication Data

US 2015/0345168 A1  Dec. 3, 2015

Related U.S. Application Data

(63) Continuation-in-part of application No. 13/040,095, filed on Mar. 3, 2011, now abandoned.

(51) Int. Cl.
| | | |
|---|---|---|
| E04H 9/10 | (2006.01) | |
| E04B 1/34 | (2006.01) | |
| E05C 19/00 | (2006.01) | |
| E04H 9/14 | (2006.01) | |
| E04H 1/12 | (2006.01) | |
| E04H 9/16 | (2006.01) | |
| E04B 1/343 | (2006.01) | |

(52) U.S. Cl.
CPC ............ *E04H 9/14* (2013.01); *E04B 1/34321* (2013.01); *E04H 1/1205* (2013.01); *E04H 9/10* (2013.01); *E04H 9/16* (2013.01); *E05C 19/003* (2013.01); *Y10T 292/23* (2015.04)

(58) Field of Classification Search
CPC .... E04H 9/00; E04H 9/04; E04H 9/10; E04H 9/14; E04H 1/12; E04H 1/1205; E04B 1/34321; E05C 19/003; E05C 19/005; Y10T 292/23; E06B 5/125

USPC ......... 52/79.9, 79.1, 302.1, 270, 198, 223.7, 52/833; 292/259 R, 288, 289, 262; 454/271, 275, 283, 284, 289, 292, 295
See application file for complete search history.

(56) References Cited

U.S. PATENT DOCUMENTS

| | | | | |
|---|---|---|---|---|
| 1,778,889 A | * | 10/1930 | Disbro .......................... | 52/470 |
| 2,281,371 A | * | 4/1942 | Mugler .......................... | 52/347 |
| 2,601,164 A | * | 6/1952 | Montgomery .................. | 52/211 |
| 2,653,468 A | * | 9/1953 | Rowles .......................... | 52/66 |
| 2,867,857 A | * | 1/1959 | McCarthy ..................... | 52/584.1 |
| 2,963,122 A | * | 12/1960 | Jagemann ....................... | 52/66 |
| 3,093,098 A | * | 6/1963 | Rosenfeld ..................... | 109/1 S |
| 3,114,153 A | * | 12/1963 | Pierson ........................ | 52/169.6 |
| 3,118,148 A | * | 1/1964 | Taylor et al. ................ | 52/169.6 |
| 3,173,387 A | * | 3/1965 | Cree, Jr. ...................... | 109/1 S |
| 3,208,410 A | * | 9/1965 | Hayes et al. .................. | 109/1 S |
| 3,343,314 A | * | 9/1967 | Smith ............................ | 52/145 |

(Continued)

*Primary Examiner* — Ryan Kwiecinski
(74) *Attorney, Agent, or Firm* — Edward L. White

(57) ABSTRACT

An improved above-ground storm shelter having sidewalls comprised of two panels, an outer panel and an inner panel, a double-swing door means for allowing ingress and egress, a door bar for securely closing the double-swing doors during a storm event, and a roof adapted to be affixed thereto, whereby sound of articles striking the sidewalls during a storm event is lessened, and the two panels provide enhanced structural integrity compared with a single panel of comparable thickness. The sidewalls are manufactured in modular segments adapted to be joined together to form a desired size of shelter. At least one segment has defined therein a ventilation port with a outer protective plate and inner protective for preventing projectiles from entering the shelter during a storm event.

6 Claims, 9 Drawing Sheets

(56) References Cited

U.S. PATENT DOCUMENTS

| | | | |
|---|---|---|---|
| 3,373,533 A * | 3/1968 | Trelfa et al. | 52/82 |
| 3,568,388 A * | 3/1971 | Flachbarth et al. | 2/588.1 |
| 3,706,168 A * | 12/1972 | Pilish | 52/234 |
| 3,713,257 A * | 1/1973 | Beavers | 52/36.6 |
| 3,934,382 A * | 1/1976 | Gartung | 52/144 |
| 3,990,197 A * | 11/1976 | Johnston | 52/125.2 |
| 4,126,972 A * | 11/1978 | Silen | 52/34 |
| 4,429,495 A * | 2/1984 | Aoki | 49/501 |
| 4,470,227 A * | 9/1984 | Bigelow et al. | 52/79.1 |
| 4,592,175 A * | 6/1986 | Werner | 52/79.9 |
| 4,914,878 A * | 4/1990 | Tamaki et al. | 52/239 |
| 4,953,734 A * | 9/1990 | Stohr | 220/4.02 |
| 5,065,558 A * | 11/1991 | Boatsman | 52/239 |
| 5,232,254 A * | 8/1993 | Teaff | E05C 19/003 292/259 R |
| 5,335,452 A * | 8/1994 | Taylor | 49/463 |
| 5,584,151 A * | 12/1996 | Abou-Rached | 52/293.2 |
| 5,638,651 A * | 6/1997 | Ford | 52/309.7 |
| 5,724,774 A * | 3/1998 | Rooney | 52/79.5 |
| 5,732,512 A * | 3/1998 | Ueno et al. | 52/19 |
| 5,953,866 A * | 9/1999 | Poole | 52/169.6 |
| 5,974,743 A * | 11/1999 | Vaia | 52/169.6 |
| 5,979,136 A * | 11/1999 | Marschak | 52/588.1 |
| 5,992,110 A * | 11/1999 | Clear | 52/271 |
| 6,006,480 A * | 12/1999 | Rook | 52/309.12 |
| 6,039,201 A * | 3/2000 | Kesterman et al. | 220/484 |
| 6,047,510 A * | 4/2000 | Gallaway | 52/347 |
| 6,161,345 A * | 12/2000 | Hope et al. | 52/169.6 |
| 6,308,471 B1 * | 10/2001 | Raynor | 52/169.6 |
| 6,334,278 B1 * | 1/2002 | Arnold | 52/79.1 |
| 6,393,776 B1 * | 5/2002 | Waller et al. | 52/169.6 |
| 6,401,403 B1 * | 6/2002 | Oviedo-Reyes | 52/79.1 |
| 6,415,557 B1 * | 7/2002 | McCalley | E04B 1/08 109/1 S |
| 6,415,558 B1 * | 7/2002 | Cherry | E04H 9/14 292/138 |
| 6,434,896 B1 * | 8/2002 | Mitchell | 52/169.6 |
| 6,438,906 B1 * | 8/2002 | Komarowski et al. | 52/169.1 |
| 6,481,252 B2 * | 11/2002 | Calle et al. | 70/94 |
| 6,539,674 B2 * | 4/2003 | Arnold | 52/79.1 |
| 6,981,347 B1 * | 1/2006 | Walburger | 52/79.1 |
| 7,080,489 B2 * | 7/2006 | Jedrzejewski | 52/272 |
| 7,127,865 B2 * | 10/2006 | Douglas | 52/745.13 |
| 7,226,093 B1 * | 6/2007 | Stailey | E05C 19/003 292/259 R |
| 7,237,362 B2 * | 7/2007 | Bishop | 52/79.2 |
| 7,356,970 B1 * | 4/2008 | Frobosilo | 52/261 |
| 7,493,729 B1 * | 2/2009 | Semmes | 52/79.1 |
| 7,521,209 B2 * | 4/2009 | Brown | 435/69.1 |
| 7,621,209 B2 * | 11/2009 | Bateman et al. | 89/36.02 |
| 7,628,430 B2 * | 12/2009 | Whitaker | 292/259 R |
| 7,690,159 B1 * | 4/2010 | Arnold | A01K 1/0035 108/35 |
| 7,762,033 B2 * | 7/2010 | Scott et al. | 52/425 |
| 8,322,085 B2 * | 12/2012 | Plumley | 52/79.14 |
| 8,776,453 B1 * | 7/2014 | Fain | E04H 9/14 109/1 S |
| 2003/0167708 A1 * | 9/2003 | Shaw et al. | 52/169.6 |
| 2003/0172597 A1 * | 9/2003 | Folkema | 52/23 |
| 2004/0003546 A1 * | 1/2004 | Sissons | 52/79.9 |
| 2004/0165942 A1 * | 8/2004 | Schmid | E04B 1/2604 403/231 |
| 2006/0254165 A1 * | 11/2006 | Bishop | 52/264 |
| 2006/0254166 A1 * | 11/2006 | Michels et al. | 52/270 |
| 2007/0094963 A1 * | 5/2007 | McDonald et al. | 52/270 |
| 2007/0151186 A1 * | 7/2007 | Hanks et al. | 52/408 |
| 2007/0158957 A1 * | 7/2007 | Kramer | E05C 19/003 292/259 R |
| 2007/0234651 A1 * | 10/2007 | Gage | E04B 1/02 52/173.2 |
| 2008/0030029 A1 * | 2/2008 | McGinnis | E05C 7/04 292/259 R |
| 2009/0013607 A1 * | 1/2009 | Whitaker | E05C 19/003 49/501 |
| 2009/0125316 A1 * | 5/2009 | Moore | 705/1 |
| 2010/0064585 A1 * | 3/2010 | Gertz | 49/70 |
| 2010/0088974 A1 * | 4/2010 | Scott, IV | 52/79.5 |
| 2010/0115858 A1 * | 5/2010 | Olsen | 52/79.1 |
| 2011/0185644 A1 * | 8/2011 | Hutter | 52/79.1 |
| 2011/0258943 A1 * | 10/2011 | De Zen et al. | 52/43 |
| 2012/0073215 A1 * | 3/2012 | Zhang | E04B 1/34321 52/79.9 |
| 2012/0192503 A1 * | 8/2012 | Connell | 52/79.1 |
| 2012/0326457 A1 * | 12/2012 | Mead | 292/259 R |
| 2015/0191949 A1 * | 7/2015 | Wilson | E05C 19/003 292/259 R |

\* cited by examiner

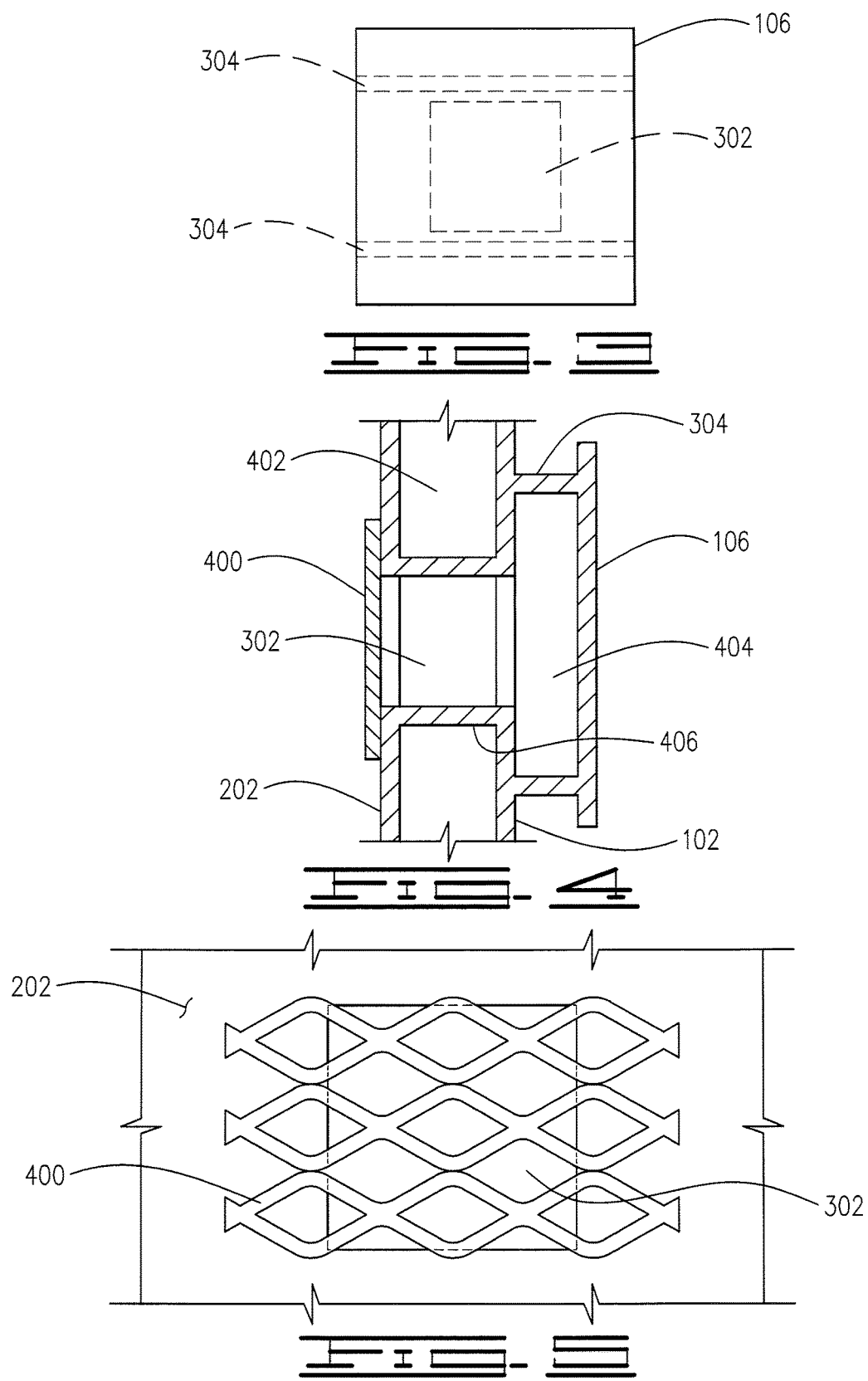

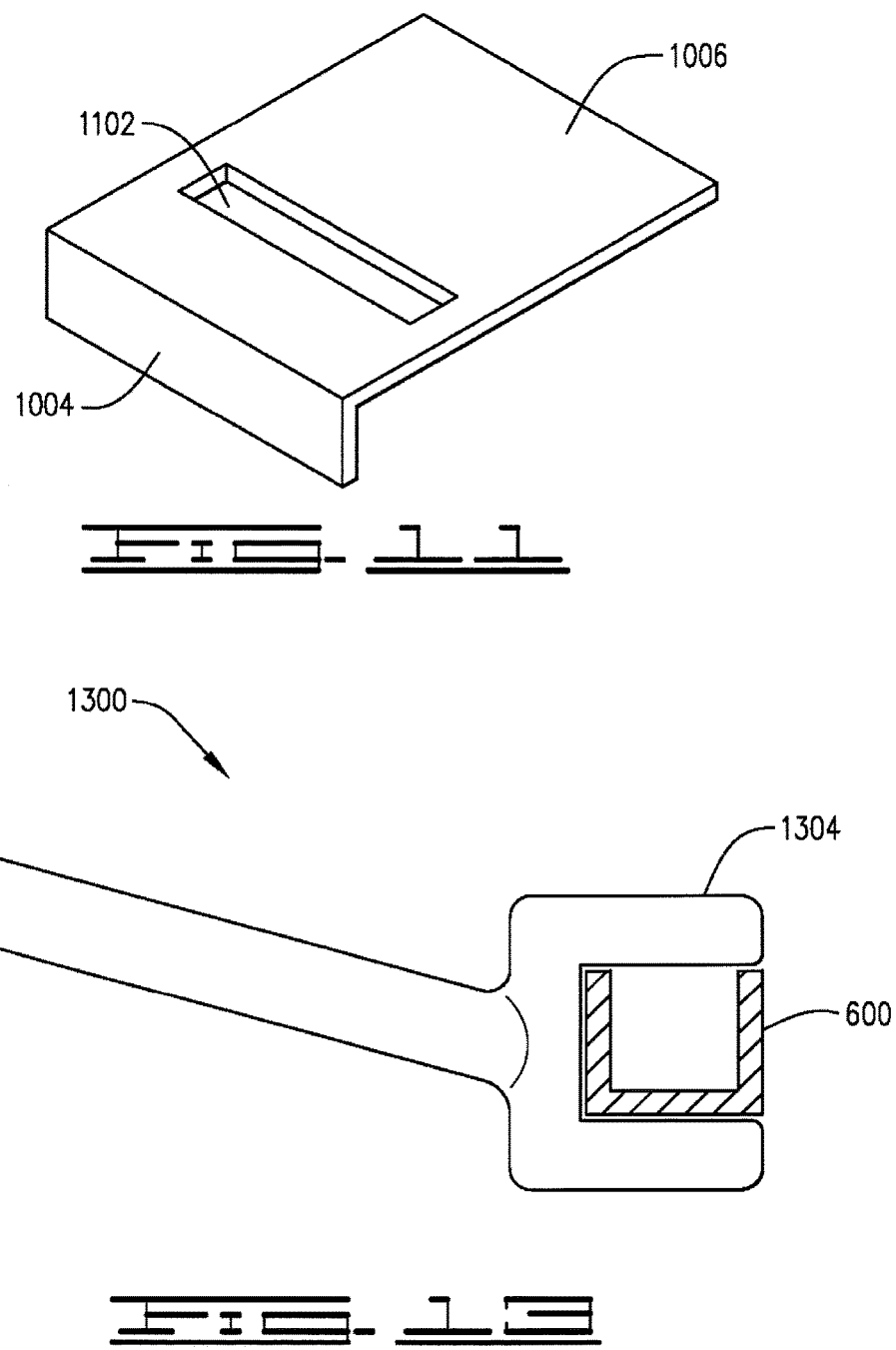

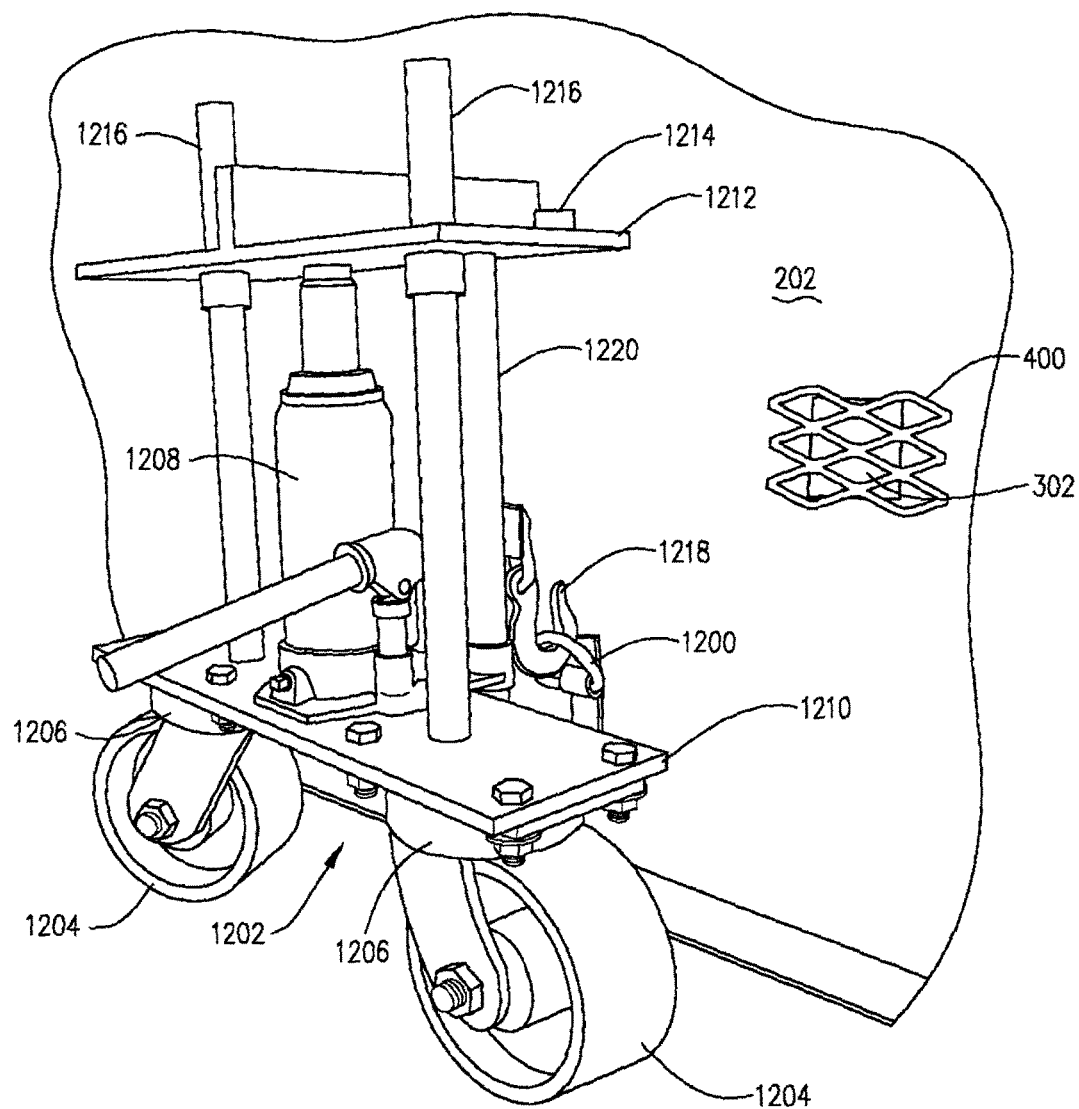

ABOVE-GROUND SHELTER

CROSS REFERENCES TO RELATED APPLICATIONS

This is a request for continued examination of U.S. application Ser. No. 14/294,855 filed on Jun. 3, 2014 that was a continuation in part of U.S. application Ser. No. 13/040,095 filed on Mar. 3, 2011. The application includes claims with a priority dated before Mar. 16, 2013 and claims with a priority date after Mar. 16, 2013.

BACKGROUND OF THE INVENTION

Field of the Invention

The present invention relates to the field of shelters. More particularly, the present invention relates to above-ground shelters which either can be installed in new construction or can be retrofitted into an existing structure.

Description of the Prior Art

The idea of a shelter from dangerous forces such as tornados, hurricanes or bombs has been around for decades. See, for example, Pierson, U.S. Pat. No. 3,114,153 for a Combination Shelter and Swimming Pool. While less than optimally functional (what, for example, does one do about the water in the pool if one needs to use the shelter?), Pierson illustrates that the idea of an in-ground shelter is not new. Presumably, Pierson was focusing his efforts on a shelter that might protect a user from the threat of Soviet nuclear attack. Before Pierson, many people installed simple cellars primarily for food storage, but also for protection from storms. Entrance to these early shelters was usually accomplished through a hinged door.

Hope et al., U.S. Pat. No. 6,161,345, and Poole, U.S. Pat. No. 5,953,866. Hope et al., claimed a "tornado shelter," and Poole claimed a "storm shelter." Both are for a shelter which is designed to be installed below ground, and which has a sliding, substantially-flat access door near ground level to allow ingress and egress. The door in Poole, which is the patent closest to the present invention, appears to covers approximately one-third of the top of the shelter. The door sits on rollers, and rolls downwardly and inwardly to open. That is, it rolls down underneath of the rest of the shelter's top. This method of operation means that by rolling downwardly, it takes room out of an already cramped shelter, and by rolling under the lid, the size of the access door is limited because it must be smaller than the remaining portion of the top of the shelter under which it rolls. The opening in Hope's shelter cannot be larger than approximately one-half of the surface area of the top of the shelter. While an opening of this size may be sufficient for some purposes, for the disabled or for very large persons, it may be difficult to enter a shelter with such a limited opening size. Further, those who are claustrophobic would find such a shelter even more constricting knowing that the opening through which they have to pass out of the shelter is so small. Also, to the extent objects are to be taken into or stored in the shelter, the smaller opening makes putting them in or taking them out more difficult.

Poole claims a similar device, but the description in Poole and the drawings are much more limited. The opening covers about half of the top of the shelter area or less. There is no description in Poole about how the lid, as shown open in FIG. 6, is prevented from tipping over as it is opened. The force of gravity would, as shown in FIGS. 5 and 6 of Poole, force the leading edge of the lid to tip under its own weight. There is no structure shown or described in Poole which would prevent this from happening. Further, the Poole lid is well above ground level, which may prevent a vehicle from parking above the shelter if installed in a garage and which would also present a tripping hazard.

Applicant previously obtained, along with a prior co-inventor, U.S. Pat. No. 7,428,800 for an in-ground shelter. It claimed an improved shelter of the type having a front wall, a back wall, two opposing side walls, a bottom and a top defining a substantially rectangular box with an opening defined in the top, a flat lid adapted to cover the opening, a roller means for alternately rolling the lid to expose or close the open top, the improvement comprising: substantially, the entire top of the box defining an opening; the lid adapted to be substantially flush with the surrounding ground level in a closed position; and a roller means for allowing the lid to slide above the ground level, exposing more than half of the top when in an open position.

The teachings of the prior art disclosed along with this application are intended to be and are hereby incorporated by reference into this application.

SUMMARY OF THE INVENTION

An improved above-ground storm shelter having sidewalls comprised of two panels, an outer panel and an inner panel, a double-swing door means for allowing ingress and egress and for remaining securely closed during a storm event, and a roof adapted to be affixed thereto, whereby sound of articles striking the sidewalls during a storm event is lessened, and the two panels provide enhanced structural integrity compared with a single panel of comparable thickness. Providing two panels separated by some distance minimizes the chances that an indentation created by a projectile will impinge into the shelter. In short, any deformation of the sidewalls is less likely, given the two panel construction, to deform the inner panel.

The outer walls may be manufactured in modular segments adapted to be joined together to form a desired size of shelter. Preferably, at least one segment has defined therein a ventilation port with a cover means for preventing projectiles from entering the shelter during a storm event while allowing equalization of pressure around at least half of the periphery of the protective plate. The door means preferably comprises two double-swing doors, each of which may be hinged, with an inner edge of a first door adjacent to the inner edge of the second door in a closed position, and a closure means for securely retaining the double-swing doors in a closed position, whereby each door can swing freely to open either inwardly or outwardly unless the closure means are engaged. The closure means comprising at least one door bar adapted to be received at each end thereof within a pair of end brackets affixed to the interior panel at either side of the door and also adapted to be received within at least one holder affixed to each of the doors, the end brackets on at least the interior panel preferably cooperating with a profile defined on the door bar to releasably lock the door bar into place. Each segment may have an open top allowing an open space between the panels to be filled with a desired material, whereby additional weight, structural integrity, and sound-deadening may be provided to the shelter.

Also disclosed is a method of installing an above-ground shelter comprising: modular wall segments having an outer panel separated from an inner panel a fixed distance apart by at least one structural member, the wall segments and structural members thereby defining a space between the panels; providing at least one double-swing door means for allowing ingress and egress into an assembled shelter;

assembling a plurality of modular wall segments and a double-swing door means into a shelter having a desired shape; affixing a roof to a top edge of the modular panels and the door segment; affixing at least one transport means for rollingly moving the assembled shelter, transporting the assembled shelter to a desired location within the structure; and affixing the shelter to a floor at the desired location. The method may include at least one of the modular wall segments with a transportation attachment point for releasably engaging a transport means. The transport means may have a jack-activated lift having at least one wheel adapted to rollingly support the transport means and an attachment point for releasably engaging a cooperating attachment point on a wall segment. Or alternately, the transport may be a powered lift.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally—especially the scientist, engineers and practitioners in the art who are not familiar with patent or legal terms or phraseology—to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

The invention will now be described in greater detail with reference to the drawings, wherein:

FIGS. 3-5 are detailed views of the protective plate, ventilation port and ventilation grate cooperating to prevent projectiles from directly entering the shelter while allowing ventilation from at least half the periphery of the protective plate. FIG. 3 is a view from the outside of an embodiment of the shelter showing the protective plate and, behind it, the ventilation port and spacer. FIG. 4 is a detailed side sectional view of an embodiment of the protective plate, spacer, ventilation port, and ventilation grate that cooperate to allow ventilation while preventing projectiles from entering the shelter. FIG. 5 is a detailed view of an embodiment of the inner ventilation grate preventing smaller projectiles from entering the shelter.

FIG. 6 shows the inside of an embodiment of a shelter according to the present invention, specifically, a pair of double-swing doors and a pair of door bars cooperating to securely retain the doors in a closed position.

FIG. 11 is a detailed view of an embodiment of a closure plate received within a receiver defined in the hopper means.

FIG. 12 shows an embodiment of a jack means for releasable attachment to a wall segment for rollingly moving an assembled, or partially assembled, shelter into position for mounting.

FIG. 13 shows an embodiment of a cheater tool to provide added leverage to rotate the door bar for disengagement.

DETAILED DESCRIPTION OF THE INVENTION

Figure 1:
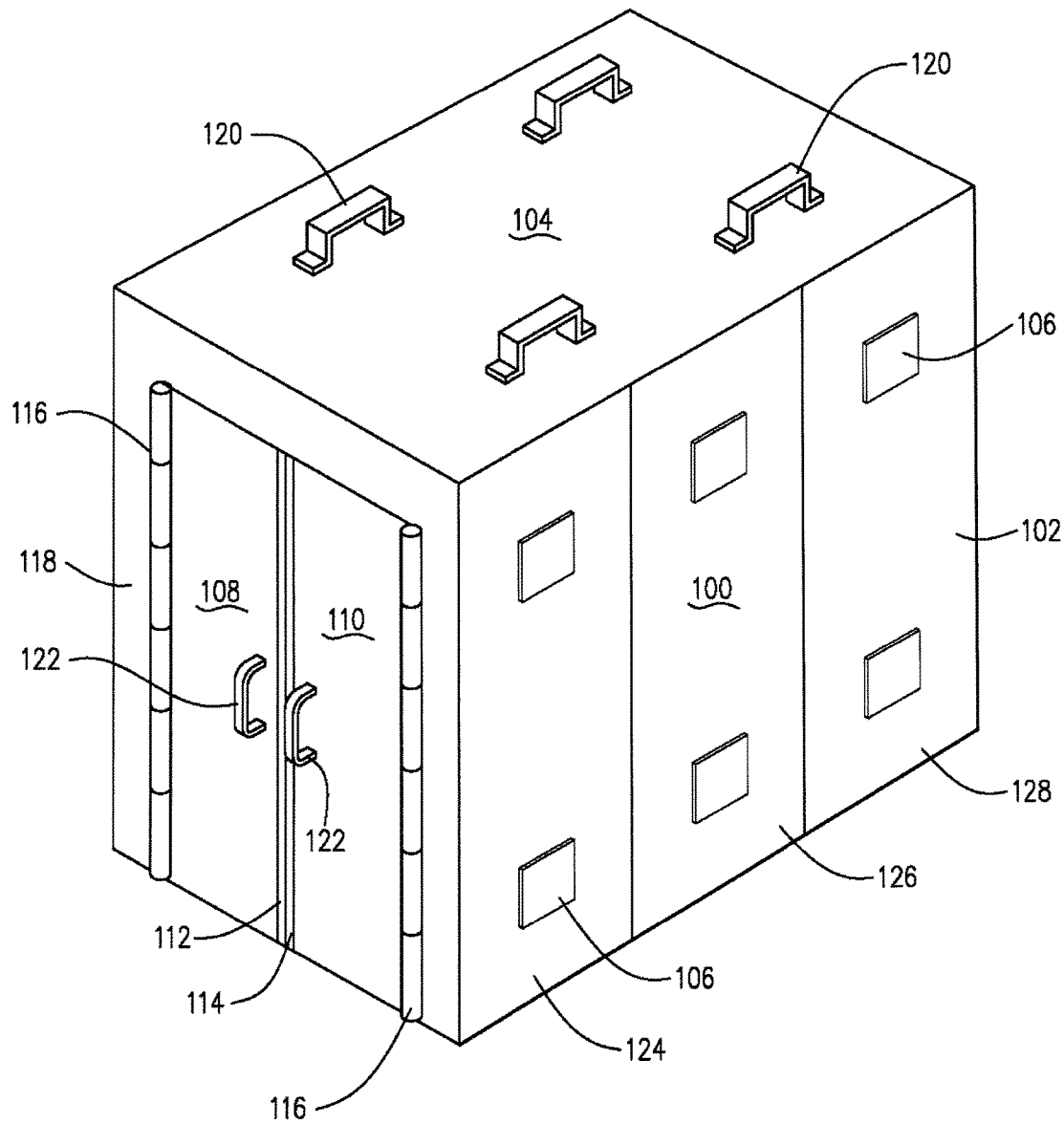
FIG. 1 is a perspective view of an embodiment of the invention.

FIG. 1 shows an above-ground shelter of the current invention in perspective view. A sidewall 100 is shown comprised of three segments: a first segment 124, a second segment 126, and a third segment 128. The three segments are joined to create the finished sidewall 100. Joinder may occur by any number of known means, including, but not limited to, welding, bolting, screwing, or joining them by cooperation of interlocking members. Segments may be provided in a wide range of standard sizes—from, for example, 6 inches to 6 feet—and they are expected to be produced in two-foot segments and other lengths allowing for easy assembly of a sidewall 100 having a desired overall length.

Figure 2:
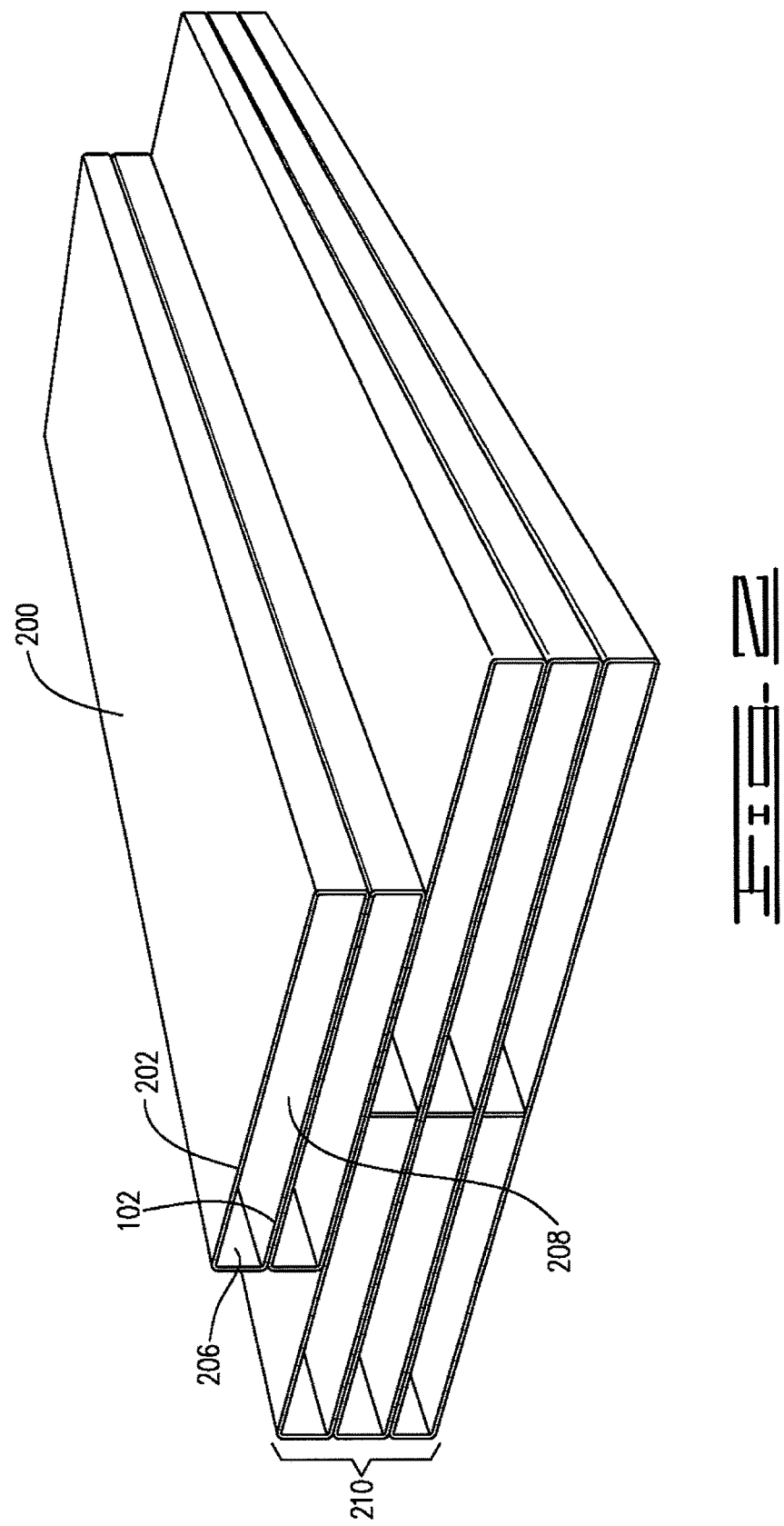
FIG. 2 is a perspective view of a stack of modular segments that can be used to construct a shelter according to the present invention.

FIG. 2 shows the segments 200 in a stack 210 prior to them being assembled into a shelter. Both the outer panel 102 and the inner panel 202 (not visible in FIG. 1) as well as the structural member 206 connecting them and holding them a fixed distance apart, thereby defining an open space therebetween can be seen. An open top 208 may be provided before the shelter may be assembled allowing aggregate materials (such as sand, concrete, gravel, polymer, or the like) to be added thereto providing additional sound insulation and structural integrity. The doors for the shelter are preferably of a similar construction having both inner and outer panels.

FIG. 1 further shows the roof 104 affixed to the shelter. Fork truck lift handles 120 are shown in FIG. 1, which allow the assembled shelter to be lifted intact by a fork truck. In many, if not most, installations the fork handles 120 will not be attached to the roof 104 because they add enough height that they make moving the assembled shelter into the typical garage installation more difficult given height restrictions associated with typical garage door clearances.

Each wall segment 124-128, as shown, may have two outer protective plates 106 mounted thereon. A more detailed discussion of the outer protective plate 106 and associated elements creating a ventilation port may be provided below in conjunction with the discussion of FIGS. 3-5. Two double-swing doors, a first door 108 and a second door 110 are shown, and for a variety of reasons, two double-swing doors are preferable to a single double-swing door, but either single or double doors may be used. Each double-swing door has hinges 116 along an outer edge and an inner door edge, a first inner door edge 112 associated with the first door 108, and a second inner door edge 114 associated with the second door 110. The first and second edges 112 and 114 abut one another in a closed position, as shown in FIG. 1. As shown, the hinges 116 are piano-type hinges that extend along the entire length of the door, though any type of hinges may be used. Piano-type hinges are preferable because they distribute any impacts over a larger area. If a projectile strikes a door with piano hinges, the door is less likely to become disconnected from the piano-type hinge, and the impact is spread out over the length of the hinge instead of being concentrated in a small area around a typical hinge. The hinges 116 allow the double-swing doors to swing either inwardly or outwardly providing maximum flexibility for egress from the shelter in case a storm event causes debris to be lodged near or against the doors. Outer door handles 122 are provided. The doors are mounted in an outer door frame 118. As shown, the frame 118 forms one entire side of a shelter, but it may have additional segments joined to one or both of its sides to make a wider shelter, if desired.

Figure 5:
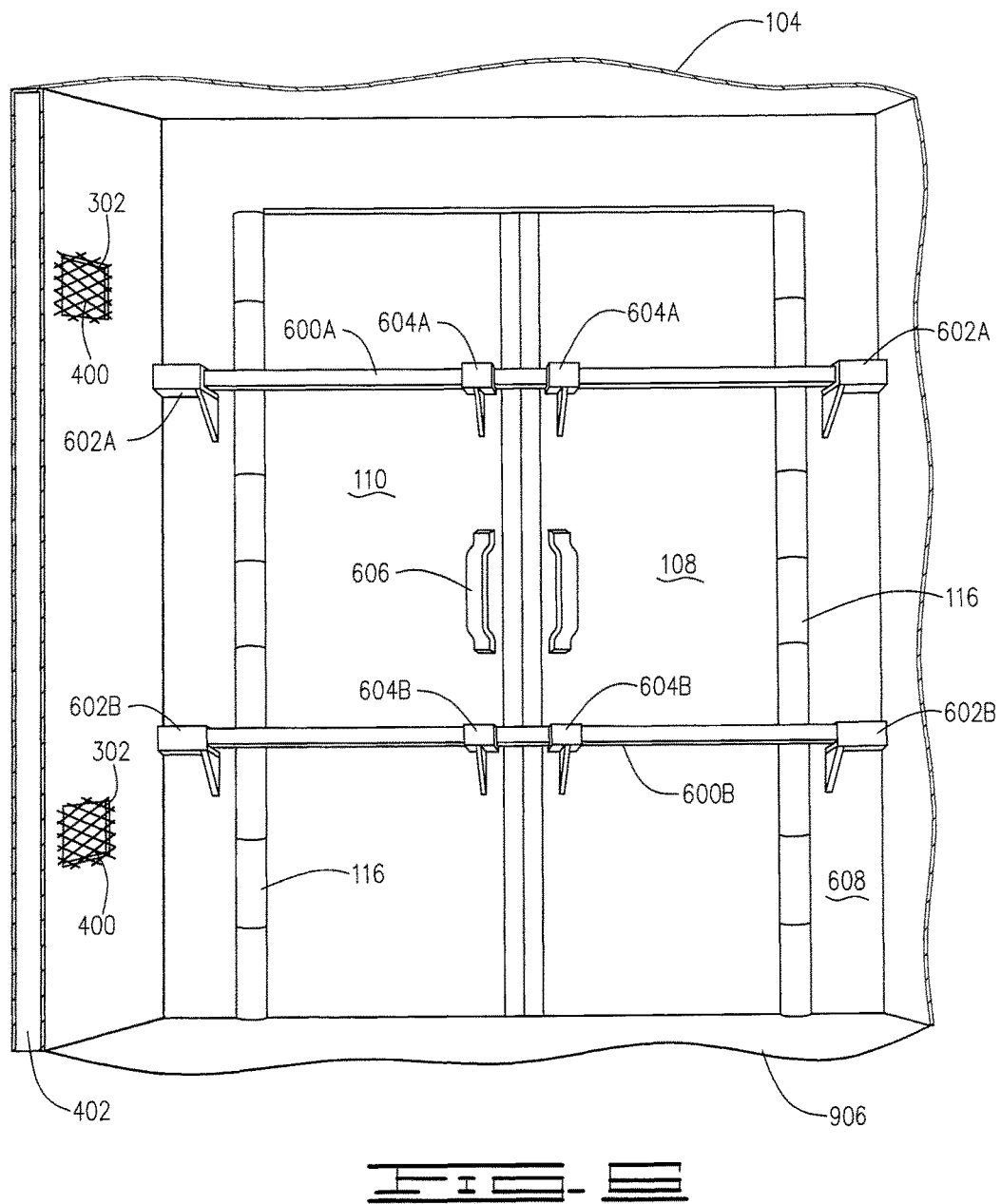

FIGS. 3-5 show the elements that cooperate to allow ventilation of the shelter while preventing projectiles from entering. Ventilation features of the present invention are designed to prevent differentials in air pressure between the space inside and outside the shelter from causing or contributing to damage to the shelter or harm to its occupants. FIG. 3 shows the outer protective plate 106, which can also be seen in FIG. 1. A ventilation structure is illustrated in FIG. 4 in cross-section. The outer protective plate 106 may be separated from the outer panel 102 by a pair of spacers 304, thereby creating a ventilation channel 404 therebetween. The ventilation port 302 shown in FIGS. 3 and 5 is square, but the channel could also have a round or other shapes. From the ventilation channel 404, air may pass through at least half the periphery of the vent, into or out of the shelter through a ventilation port 302 defining an opening between the outer panel 102 and the inner panel 202. To prevent communication with the open space 402 defined between the outer panel 102 and the inner panel 202, the ventilation port 302 may be preferably lined, for example by a piece of tubing or pipe, whether square, round, or some other shape, the lining having at least one wall 406 extending from the outer panel 102 to the inner panel 202. If lined, the structure of the liner provides additional stability to the two walls against potential deformation or damage from storm debris or pressure differentials. Further protection against projectiles entering the shelter may be provided by a ventilation grate 400 affixed to the inner panel 202.

FIG. 6 shows the inside of a shelter according to the present invention, specifically, a pair of double-swing doors 108 and 110 and at least two door bars 600A and 600B, as shown, and potentially three or more door bars cooperating to securely retain the double-swing doors in a closed position. The door means preferably includes two double-swing doors, but it may be a single double swing door. Two double-swing doors provide double the opportunity to safely ingress and egress should a hinge or other door component become damaged. Also, a wider opening can be provided with less swing clearance required. Preferably, each double-swing door has a handle 606. The double-swing doors, mounted within an inner door frame 608, are shown in a closed position, and the door bars are in position to securely retain them in the closed position. Each door bar engages, at each of its ends, an end bracket 602A, and 602B. The end brackets have a u-shaped profile adapted to releasably engage the u-shaped door bars to effectively lock them into position. See descriptions of FIGS. 7 and 8, below. The double-swing doors are prevented from moving inwardly or outwardly by engagement with holders, 604A and 604B. These holders are affixed to the doors 108 and 110 near the inner door edges 112 and 114 respectively. For each door bar, there are a pair of end brackets 602 and a pair of holders 604.

Figure 7:
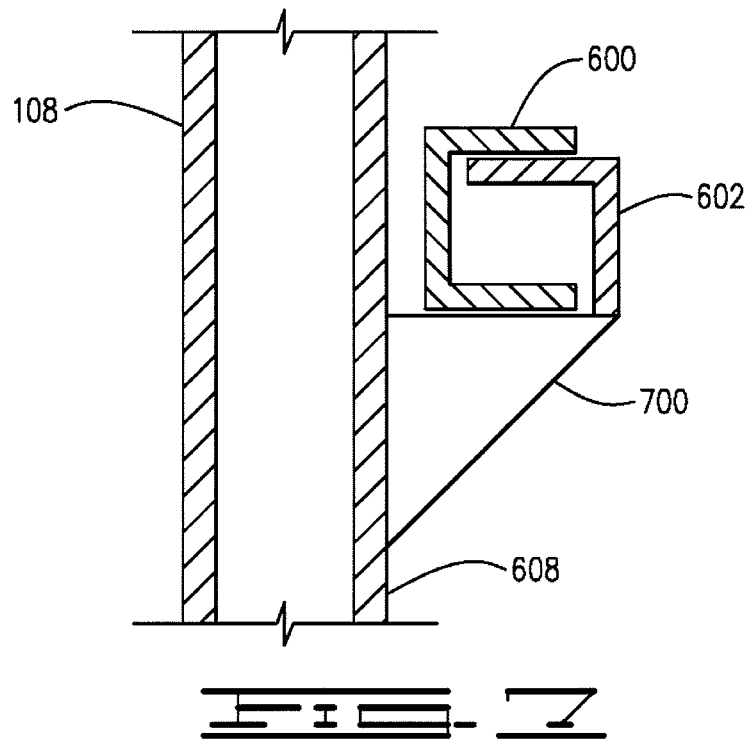
FIGS. 7 and 8 are detailed sectional views of a bracket support for the door bar and, in cooperation, they show how the u-shaped door bar releasably locks into place in cooperation with a u-shaped portion of the bracket support. The door bar may be rotated counterclockwise, as shown, from a disengaged position to the partially engaged position in FIG. 7, and finally into the engaged position shown in FIG. 8.
Figure 8:
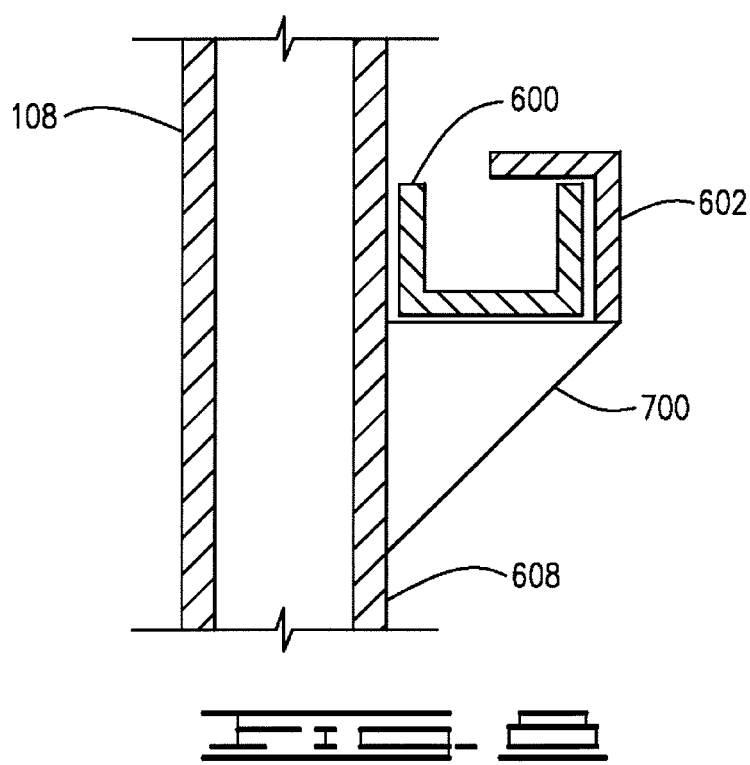

FIGS. 7 and 8 are detailed sectional views of a bracket support 700 for the door bar 600 and together they show how the u-shaped door bar 600 releasably locks into place in cooperation with a u-shaped portion of the bracket support 700. The door bar 600 may be rotated counterclockwise, as shown, from a disengaged position to the partially engaged position in FIG. 7, and finally into the engaged position shown in FIG. 8. Other well-known means could be used to perform the same function such as, for example, using a keeper rotatably affixed to the inner door frame 608 to close over the door bar 600 once it is in position and some sort of fastener, such as a rotatable locking clip, to secure the keeper in place. Alternatively, one end of the door bar 600 may be inserted into a close-fitting keeper, with the other end bound to the inner door frame 608 by a cable lock mechanism. Many alternative ways of releasably, yet securely engaging the door bar are known in the art, and those are incorporated herein by reference. See, for example, U.S. Pat. No. 3,806, 179 to Roessle; U.S. Pat. No. 4,442,911 to O'Neal et al.; U.S. Pat. No. 4,548,436 to Cole, Jr.; U.S. Pat. No. 7,770,420 to Carr and the patents referenced by them.

Figure 9:
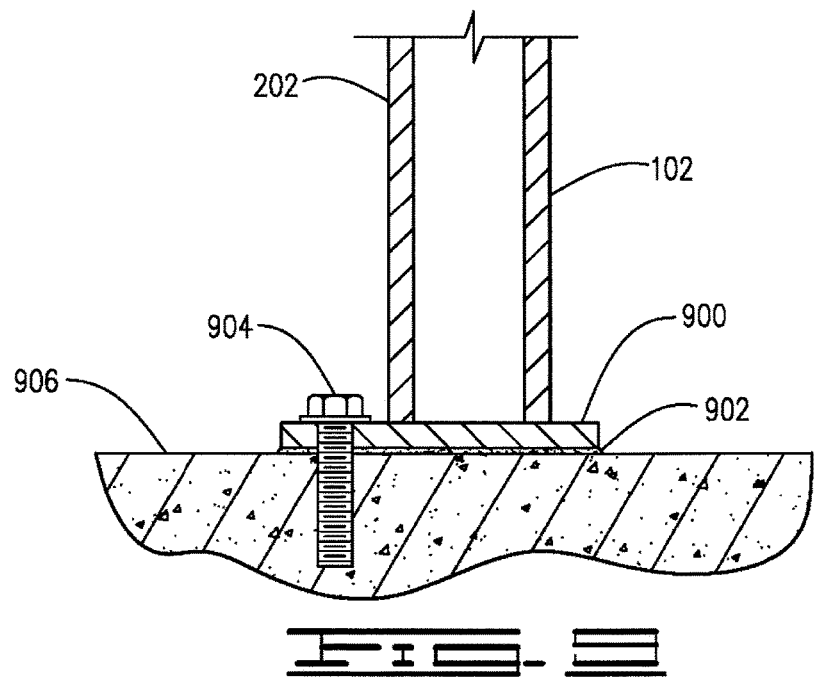
FIG. 9 is a detailed sectional side view of a portion of a wall segment of an embodiment of the invention showing how it is glued and fastened to the floor.

FIG. 9 is a detailed sectional side view of a portion of a wall segment showing how it may be glued and fastened to the floor. A base plate 900 may be affixed to a bottom edge of a segment, preferably to both the inner and outer plates 202 and 102. Two means of affixing the plate 900 to the floor 906 are shown, glue 902 between the plate and the floor, and an anchor 904 passing through the base plate 900 into the floor 906.

Figure 10:
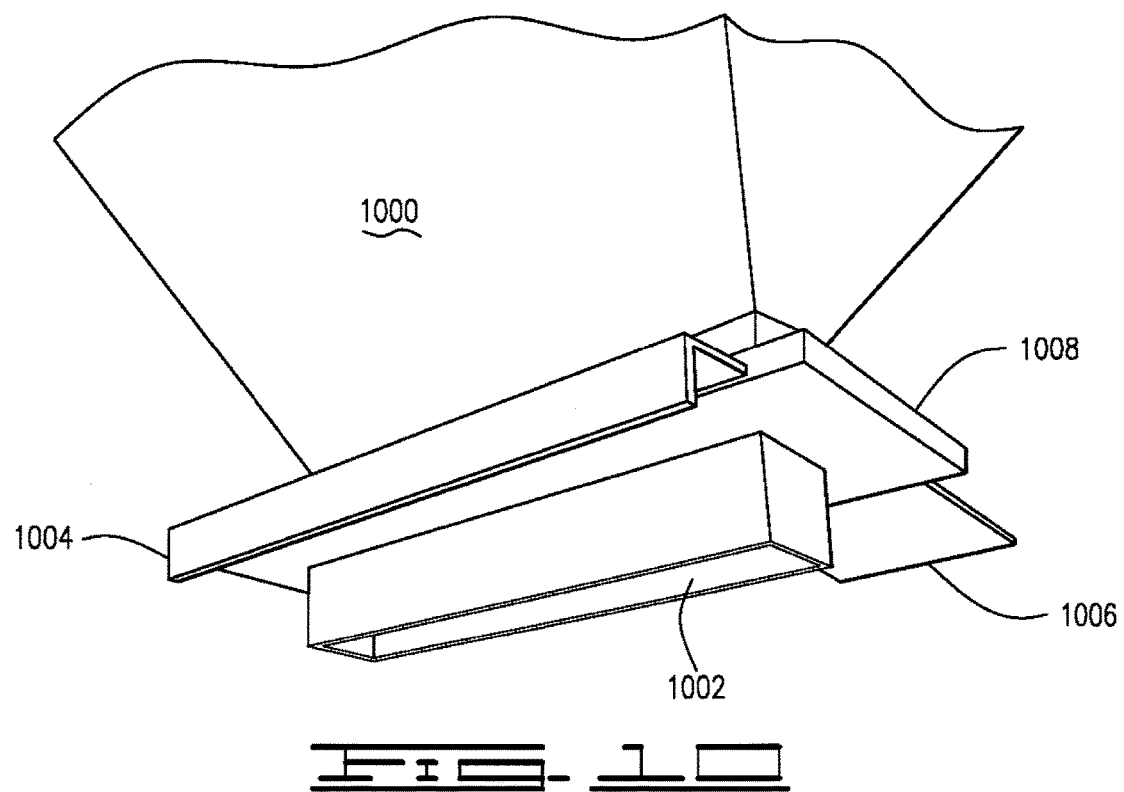
FIG. 10 is a perspective view of an embodiment of a hopper means for placing an aggregate material into the open space defined between the outer and inner panels.

FIG. 10 is a perspective view of one embodiment of a hopper means for placing an aggregate material into the open space 402 defined between the outer and inner panels 102 and 202. A hopper 1000 is affixed above and connected to a dispensing port 1002 adapted and sized to be received within the open top 208 of a wall segment. Between the hopper 1000 and the dispensing port 1002 may be a closure plate receiver 1008 defining a slot therein for slidingly receiving a closure plate 1006. An operator moves the closure plate 1006 by grasping the closure plate handle 1004 and either pushing or pulling it as indicated to move a dispensing slot 1102, shown in FIG. 11 into the desired position to either allow flow of an aggregate material (i.e., with the dispensing slot 1102 lined up with the dispensing port 1002) or to stop such flow.

Preferably, each segment has an open top 208 allowing an open space defined between the panels 108 and 208 to be filled with a desired aggregate material, whereby additional weight, structural integrity and sound-deadening may be provided to the shelter. The aggregate material may be selected from the group of sand, gravel, concrete, foam, plastic, fiberglass, shredded paper, or a polymer. Any material that may be flowingly added to a void space may be used for this purpose, and the material selected for any particular installation will depend on factors including cost, purpose to be achieved (for example, concrete adds strength, while sand may merely add weight and sound-deadening properties), and ease of installation and availability. Other properties of the aggregate relevant to selection may include its insulating properties (e.g., fiberglass) or its susceptibility to burning (e.g., shredded paper), or its weight (in some cases, extra weight may be desirable and undesirable in others).

FIG. 12 shows a jack means for relatable attachment to a wall segment for rollingly moving an assembled, or partially assembled, shelter into position for mounting. The jack-activated lift 1202 has at least one wheel 1204, which may be preferably fitted with a caster 1206 to allow it to pivot. On a lower plate 1210 a jack 1208 may be mounted which is adapted to engage an upper plate 1212. The plates are slidingly connected by sliding guides 1216. A shown, the sliding guides are affixed to the lower plate 1210 and slidingly received within the upper plate 1212, but that configuration could be reversed. Affixed to the upper plate may be a hook post 1220 upon which a hook 1218 may be mounted. The hook may be adapted to releasably engage a cooperating attachment point 1200 affixed to the inner panel 202 or an outer panel 102. A roller 1214 may be also affixed to the upper plate for pressing engagement with the inner panel 202.

In operation, the jack 1208 may be raised or lowered to a height where the hook 1218 can engage the attachment point 1200. The jack is then raised so that a bottom edge of the shelter clears the surrounding floor by a desired clearance. At least one other jack-activated lift 1202 is preferably attached to a different attachment point 1200. Once at least a couple of jack-activated lifts are attached, the entire shelter can be raised to a desired height and easily wheeled to a desired location. The design of the jack-activated lifts 1202 requires only minimal clearance above the surrounding floor since nothing has to be inserted beneath the shelter for lifting. Rather, the attachment point 1200 is on the inner or outer panel 202 or 102.

As an alternative to the jack-activated lift 1202, a powered lift can be provided. The powered lift could be electric or powered by an internal combustion engine. The lift may engage attachment points 1200, or it may lift the shelter by engagement with the roof 104. The powered lift would be of the type commonly known as a forklift. Preferably, the powered lift will have a customized engagement feature for engaging the shelter, either like the engagement point shown for the jack-activated lift 1202, or it may engage the roof of the shelter to lift it for rolling into place. A properly designed powered lift could also engage a lower edge of the shelter, but that method is disfavored since it would then be disposed between the lower edge and the floor when lowered, potentially damaging the floor and/or spreading the glue that may be used to affix the shelter in place.

FIG. 13 illustrates an embodiment of a cheater tool 1300 adapted to engage the door bar 600. The tool has a handle 1302 attached to an engaging jaws 1304 adapted to engage the door bar 600. Once engaged, a person in the shelter can apply added torque through the operation of the handle 1302 on the engaging jaws 1304 and thus onto the bar 600 to ensure that it can be rotated into a removal position even if the shelter doors are damaged in a storm event. Preferably, the cheater tool will be stored on a hook on an inside wall of the shelter.

Figure 14:
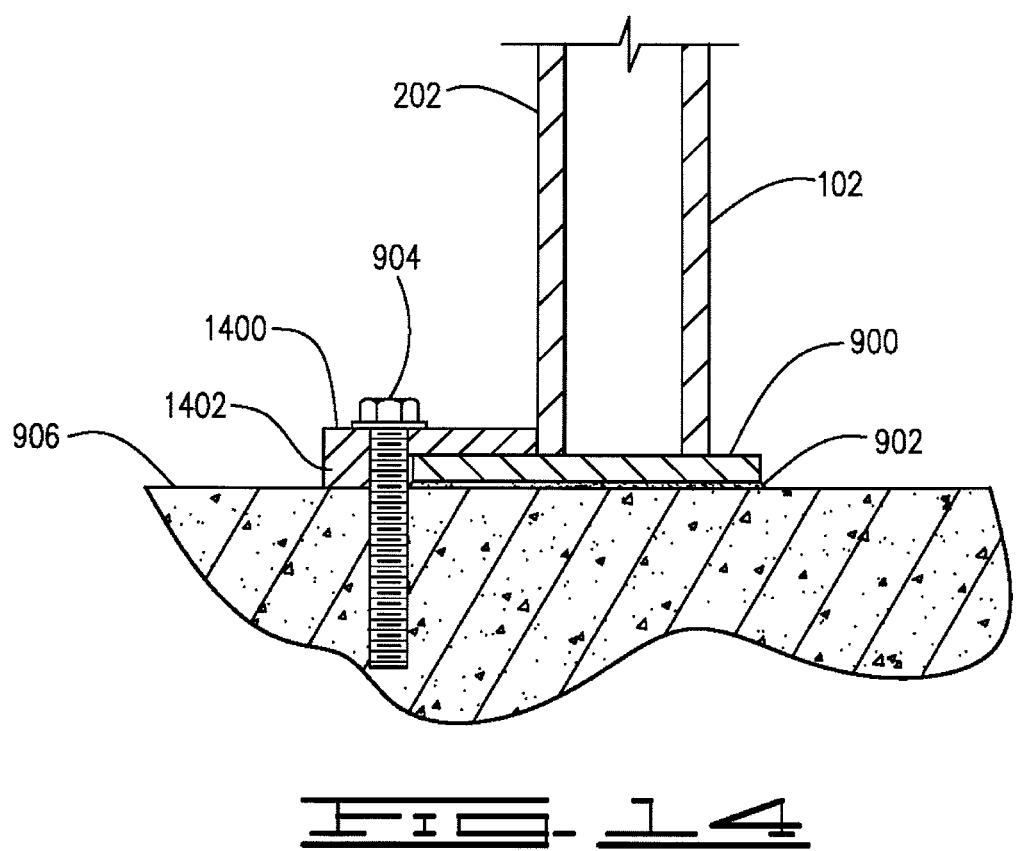
FIG. 14 shows a cross-sectional side view of a floor attachment means.

FIG. 14 illustrates a cross sectional side view of a wall segment and an embodiment of an alternative floor attachment means. A base plate 900 may be attached to either the inner 202 or outer panel 102 of the segment or, preferably, both. The retention plate 1400 may be attached via a fastener 904 passing through a hole in the plate 1400 and into the floor 906. The retention plate 1400 preferably has an outer shim portion 1402 adapted to retain it in a substantially horizontal position. The shim portion 1402 has substantially the same thickness as the base plate 900. In another embodiment, an anchor may be placed into the floor to receive the fastener. The fastener 904 and/or anchor can be any one of a number of well-known devices such as wedge anchors, strike anchors, drop-in anchors, self-tapping screws, sleeve anchors, metal hit anchors, split drive anchors, machine screw anchors, lag shield anchors, or single or double expansion anchors. The retention plate 1400 clamps the base plate 900 into place, but is not permanently affixed to the base plate 900. The alternative floor attachment mechanism reduces leverage on the fastener 904.

Having thus described the invention, I claim:

1. An above-ground storm shelter comprising:
   a. sidewalls manufactured in modular segments in at least one width adapted to be joined together to form a desired size of shelter, each segment having planar sidewalls comprised of two panels, an outer panel and an inner panel, and at least two linear structural members maintaining them a fixed distance apart;
   b. at least one segment of said modular segments having defined therein a ventilation port with an inner and outer cover means for preventing projectiles from entering the shelter during a storm event while allowing equalization of pressure;
   c. at least one double-swing door, each of which is hinged to swing freely inwardly or outwardly;
   d. at least one door bar to be received at each end thereof within a pair of first end brackets affixed to the inner panels adjacent to the at least one door and also to be received within at least one holder affixed to each of the at least one door wherein the door bar is configured to axially rotate to cooperatively interlock, with each of the pair of first end brackets, thereby preventing the at least one door from swinging inwardly and outwardly once interlocked;
   e. a roof adapted to be affixed thereto; and
   f. an affixation means for securely attaching the shelter to a floor.

2. The shelter of claim 1, wherein the at least one door bar further comprises a second door bar having a profile adapted to be received within a pair of second end brackets affixed to the inner panel adjacent to the at least one door and within an additional holder of the at least one holder affixed to each of the at least one door, the second door bar is configured to axially rotate to cooperative interlock with each of the pair of second end brackets, thereby preventing the at least one door from swinging inwardly and outwardly once interlocked.

3. The shelter of claim 1, the affixation means comprising:
   a. at least one base plate affixed along the bottom of at least one segment;

b. at least one retention plate adapted to fit over the at least one base plate and having an extending portion extending beyond the base plate with a hole defined through the extending portion; and
c. a fastener passing through the hole and adapted to engage the floor to affix the at least one retention plate thereto, whereby, the cooperative action of the retention plate and the fastener securing the base plate and the attached shelter to the floor to prevent it from being lifted off during a storm event and reducing leverage on the fastener.

4. The shelter of claim 3, the affixation means further comprising a shim portion disposed at an outer edge of the retention plate, the shim portion having substantially the same thickness as the base plate.

5. The shelter of claim 1, the ventilation port further comprising:
a. a passage defined between the inner and outer panels;
b. an outer cover means having—
   i. an outer protective plate with dimensions at least as large as the passage,
   ii. the outer protective plate affixed a distance from the outer panel and defining an air passage having an area at least half of the periphery of the ventilation port, and
   iii. an outer protective plate orientation and affixation adapted to prevent the accumulation of debris due to horizontal surfaces;
c. an inner cover means having—
   i. an inner protective grate affixed onto the inner panel, at least as large as the passage; and
   ii. access to the passage within the ventilation port wherein debris may be removed from the passage to maintain airflow into the shelter.

6. An above-ground storm shelter comprising:
a. sidewalls manufactured in modular segments in at least one width adapted to be joined together to form a desired size of shelter, each segment having planar sidewalls comprised of two panels, an outer panel and an inner panel, and two structural members maintaining them a fixed distance apart;
b. at least one double-swing door, each of which is hinged to swing freely inwardly or outwardly;
c. at least one door bar received at each end thereof within a pair of end brackets having a profile affixed to the inner panel adjacent to the at least one door and also received within at least one holder affixed to each of the at least one door, the at least one door bar having a profile adapted to be received within each end bracket, and within each holder on each of the at least one double-swing door, wherein the at least one door bar is configured to axially rotate to cooperatively interlock with each of the pair of end brackets and holders and releasably lock the at least one door bar into place;
d. a ventilation port having—
   i. a passage defined between the inner and outer panels,
   ii. an outer protective plate at least as large as the passage, the outer protective plate
   affixed a distance from the outer panel and defining an air passage having an area at least half of the periphery of the passage, and
   iii. an inner protective grate affixed onto the inner panel, at least as large as the passage;
e. and an attachment means having—
   i. at least one base plate affixed along the bottom of at least one of the segments;
   ii. at least one retention plate adapted to fit over the at least one base plate and have an extending portion extending beyond the at least one base plate with a hole defined through the extending portion; and
   iii. a fastener passing through the hole and adapted to engage the floor to affix the at least one retention plate thereto.

* * * * *